United States Patent
Chamorro et al.

(10) Patent No.: US 11,658,812 B1
(45) Date of Patent: May 23, 2023

(54) DISTRIBUTED KEY MANAGEMENT SYSTEM

(71) Applicant: CLOUDFLARE, INC., San Francisco, CA (US)

(72) Inventors: Derek Chamorro, Austin, TX (US); Michael Pak, Portland, OR (US); Ignat Korchagin, Orpington (GB); Chase Robinson, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/956,689

(22) Filed: Sep. 29, 2022

(51) Int. Cl.
*H04L 9/08* (2006.01)
(52) U.S. Cl.
CPC .................... *H04L 9/083* (2013.01)
(58) Field of Classification Search
CPC ...................................... H04L 9/083
See application file for complete search history.

(56) References Cited

U.S. PATENT DOCUMENTS

| | | | | |
|---|---|---|---|---|
| 10,326,597 | B1* | 6/2019 | Roth | H04L 9/0841 |
| 2009/0092252 | A1* | 4/2009 | Noll | H04L 9/083 |
| | | | | 380/277 |
| 2016/0253515 | A1* | 9/2016 | Damgård | G06F 21/602 |
| | | | | 713/165 |
| 2016/0269370 | A1* | 9/2016 | White | H04L 63/062 |
| 2019/0394024 | A1* | 12/2019 | Vepa | H04L 63/062 |

* cited by examiner

*Primary Examiner* — Henry Tsang
(74) *Attorney, Agent, or Firm* — Nicholson De Vos Webster & Elliott LLP (57) ABSTRACT

A distributed key management system (KMS) includes a central KMS server and multiple intermediate KMS servers. The central KMS server replicates managed keys to the intermediate KMS servers. An intermediate KMS server receives a KMS service request from a KMS client, where any of the intermediate KMS servers are capable of servicing the request. The intermediate KMS server performs the action requested if it has access to the necessary managed key and returns the response to the KMS client. If it does not have access to the necessary managed key, the intermediate KMS server transmits a request for the managed key to the central KMS server. The intermediate KMS server receives the managed key, performs the action requested, and returns the response to the KMS client.

24 Claims, 8 Drawing Sheets

DISTRIBUTED KEY MANAGEMENT SYSTEM

FIELD

Embodiments of the invention relate to the field of networking; and more specifically, to a distributed key management system.

BACKGROUND

A key management system (KMS) is used to manage cryptographic keys. A KMS can manage the lifecycle of cryptographic keys (e.g., key creation, key rotation, key import/export, key replication), manage cryptographic operations using cryptographic keys (e.g., encrypting, decrypting, signing, verifying), manage access (e.g., key access, permission granting, revocation, and/or manage administration (e.g., user/configuration management, key usage logging, monitoring configuration, audit functions).

Conventionally, a KMS is provided as a central server and has a one-to-one relationship with its clients. That is, a client interacts with a specific KMS.

SUMMARY

A distributed key management system (KMS) includes a central KMS server and multiple intermediate KMS servers. The central KMS server replicates managed keys to the intermediate KMS servers. An intermediate KMS server receives a KMS service request from a KMS client, where any of the intermediate KMS servers are capable of servicing the request. The intermediate KMS server may be the one that is closest to the KMS client out of the intermediate KMS servers. The intermediate KMS server performs the action requested if it has access to the necessary managed key and returns the response to the KMS client. If it does not have access to the necessary managed key, the intermediate KMS server transmits a request for the managed key to the central KMS server. The intermediate KMS server receives the managed key, performs the action requested, and returns the response to the KMS client.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A distributed key management system (KMS) is described. The distributed KMS includes a central KMS server and multiple intermediate KMS servers. The central KMS server centrally manages the lifecycle, access, cryptographic operation, and administration of managed keys and associated policies. The central KMS server periodically replicates the managed keys and associated policies to the intermediate KMS servers. Each intermediate KMS server stores the replicated managed keys and policies. A first intermediate server may receive keys and associated policies from a second intermediate server in addition to or in lieu of receiving the same from the central KMS server.

Each intermediate KMS server can provide a key service to a KMS client such as encrypting a data key, decrypting a data key, signing, verifying, creating a data key, creating a data key pair, and/or generating a random number. The intermediate KMS servers are geographically distributed to be closer to KMS clients to improve response time. Each KMS client can transmit a key service request to any of multiple intermediate KMS servers. For example, the KMS client may be configured with a primary intermediate KMS server and one or more secondary intermediate KMS servers. The KMS client may transmit the key service request to the primary intermediate KMS server and if it is not available, or it is slow to respond, the KMS client may transmit the key service request to one of the secondary intermediate KMS server(s). If the intermediate KMS server does not have the necessary key in its key store to complete the key service request (e.g., the key that can unwrap the data key), the intermediate KMS server queries the central KMS server for the key.

Conventional key management systems are provided with a central server. Such a central server may not be located near all the clients it serves and thus performance can be slow. Unlike these conventional systems, embodiments describe a distributed KMS that includes intermediate KMS servers that are each capable of servicing KMS clients. These intermediate KMS servers are geographically distributed and are typically closer to the KMS clients. This increases performance by reducing the time for the requests and responses to traverse the network.

Conventional key management systems also have a one-to-one relationship with the central server and its clients. That is, a client can only make a request to a single central KMS server. Unlike these conventional systems, the KMS client can transmit a key service request to any of multiple intermediate KMS servers. This improves resiliency. For example, if one intermediate KMS server is down or is slow to respond, the KMS client can transmit the key service request to another intermediate KMS server.

Further, an intermediate KMS server can receive managed keys and/or updated policies from another intermediate KMS server instead of, or in addition to, the central KMS server. This improves resiliency in times where the central KMS server may be down or slow to respond.

Figure 1:
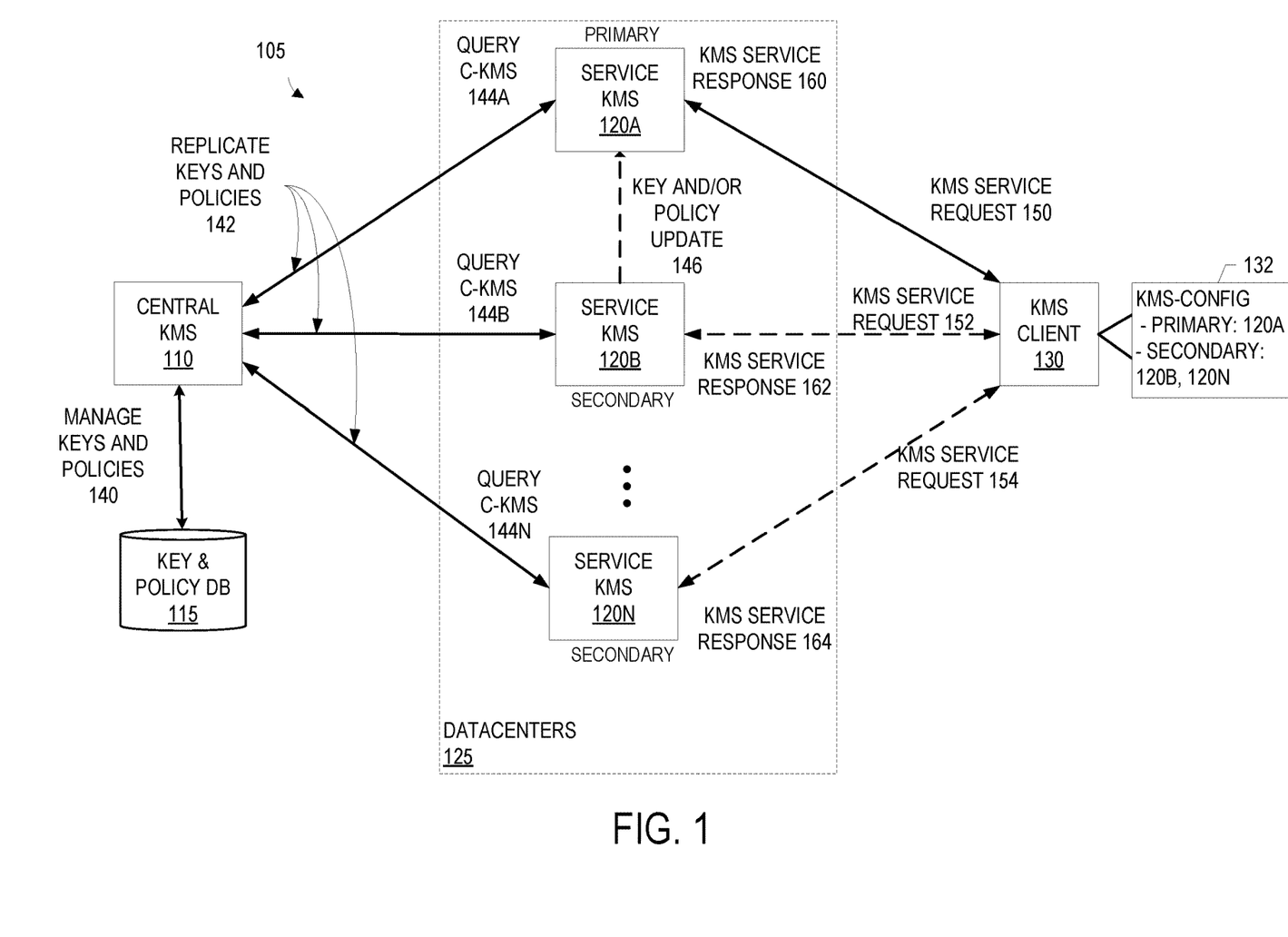
FIG. 1 shows an exemplary distributed KMS according to an embodiment.

FIG. 1 shows an exemplary distributed KMS according to an embodiment. The system 105 includes the central KMS 110, the service KMSs 120A-N, and the key client 130. Each service KMS 120 is an intermediate KMS. Although FIG. 1 shows a single central KMS 110, in an embodiment there are multiple central KMSs (e.g., a primary central KMS and one or more backup central KMSs).

The central KMS 110 centrally manages the lifecycle, access, operation, and administration of managed keys and associated policies at operation 140. A managed key is a key that is administered via policy. As examples, the managed keys may be root key(s), primary key(s), and/or key encryption key(s) that are used to protect other keys (e.g., other key encryption keys and/or data encryption keys (data keys)). For instance, a managed key may be used to protect session keys while they are in storage, in use, and/or in transit. The managed keys may also be a public key pair used for digital signature generation and verification. Each managed key may be associated with a policy that is used to enforce fine-grained access control using one or more attributes such as identity (e.g., a specific user, a specific application), IP address, and/or protocol.

Lifecycle management may include managed key creation, managed key rotation, managed key deletion, managed key importing, managed key exporting, and/or managed key replication. Managed key creation may include creating a symmetric managed key that does not leave the central KMS 110 in plaintext and/or creating an asymmetric managed key-pair where the private key does not leave the central KMS 110 in plaintext. Managed key rotation may include periodically, or on-demand, rotating a managed key. Managed key deletion may include deleting a managed key after a specific time period or on-demand. Managed key importing may include creating a new managed key and/or rotating a managed key from imported encrypted key material and metadata. Managed key exporting may include exporting encrypted managed key material and metadata. Managed key replication may include replicating a managed key.

Cryptographic operation management may include encrypting data (e.g., a data encryption key) using a managed key, decrypting data (e.g., an encrypted data key) using a managed key, signing data (e.g., creating a digital signature of a message or message digest using a managed key), verifying a message signature, creating a data key, and/or creating a data key-pair.

Access management may include managed key access and/or function permission grant and/or revocation. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). Administration management may include user and configuration management, key usage logging and monitoring configuration, and/or audit functions.

The managed keys and associated policies are stored at the managed key and policy database 115. The managed key and policy database 115 may be stored in a hardware security module (HSM). Although FIG. 1 shows a single database that stores the key(s) and policy(ies), there may be multiple databases that store this information (e.g., a database or other structure that stores managed keys and a separate database or other structure that stores policies).

The central KMS 110 is connected with the service KMSs 120A-120N. The central KMS 110 periodically replicates the managed keys and associated policies to the service KMSs 120A-N at operation 142. The replication may be done on a scheduled interval and/or on-demand as needed. The service KMSs 120A-120N are geographically located to be near KMS clients such as the KMS client 130. For example, each service KMS 120 may be in a different datacenter and there may be hundreds to thousands of datacenters geographically distributed. Each datacenter may include multiple KMS clients. There may be multiple service KMSs in each geographic region.

The service KMSs 120A-120N store the managed keys and associated policies received from the central KMS 110 and provide key operation services (e.g., encrypting, decrypting, signing, verifying, etc.) and potentially other key management services to endpoint systems such as the KMS client 130. The service KMSs 120A-120N are configured to query the central KMS 110 at operations 144A-144N respectively when a managed key to service a KMS service request from the KMS client 130 is not locally available.

In an embodiment, a service KMS may receive managed keys and associated policies from another service KMS. For instance, the service KMS 120A receives a managed key and/or policy update 146 from the service KMS 120B. This may occur, for example, when a service KMS receives a non-scheduled replication of a managed key and associated policy and/or policy update from the central KMS 210. As another example, a service KMS in a region or partition may act as a gateway in that region or partition and communicate managed keys and policies with other service KMS in that region. In such a case, the gateway service KMS receives the replicated keys and policies from the central KMS 110 and replicates these keys and policies to the other service KMS in the region or partition.

The KMS client 130 is a client of the distributed KMS service. As an example, the KMS client 130 may be a compute server in a distributed cloud computing network. Such a compute server may process network traffic (e.g., HTTP/S requests/responses, SPDY requests/responses, or other network traffic) and may provide services including protecting against internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), and/or other services. Although one KMS client is shown in FIG. 1, there are many KMS clients that are clients of the distributed KMS service.

The KMS client 130 transmits a KMS service request to the distributed KMS service. The KMS service request is a request related to a managed key of the distributed KMS. For example, the KMS service request may be a request to encrypt a data key, decrypt a data key, sign a message, verify a signed message, create a data key, create a data key pair, or generate a random number. A KMS service request includes the requested action (e.g., encrypt, decrypt, sign, verify, etc.), a key identifier that identifies a managed key to be used for the requested action, and may include the data on which the requested action is to be performed. The KMS service request may also include a subject identifier that identifies the subject identity associated with the KMS service request (e.g., a user, a group, an application, a system) and may include credential(s) of the subject identity. For instance, the subject identifier and credential may take the form of a user ID and password/API key. The KMS service request may also include additional information used to validate the subject identity and/or the request such as host information (e.g., IP address, OS version, patch status, device posture, etc.). The KMS client 130 transmits a KMS service request to any of multiple service KMSs 120A-N, and each of the multiple service KMSs 120A-N can process the KMS service request.

In an example, the KMS client 130 may be configured with a primary service KMS and one or more secondary service KMSs. As illustrated in FIG. 1, the KMS client 130 includes the KMS configuration 132 that indicates the service KMS 120A is the primary service KMS, and the service KMS 120B and the service KMS 120C are secondary service KMSs. The service KMS 120 that is chosen as the primary KMS may be the one that is closest to the KMS client 130 or otherwise is the one that can provide a result to the KMS client 130 the fastest under normal operating conditions. In the example of FIG. 1, the service KMS 120A is the one out of the service KMSs 120A-N that is closest to the KMS client 130 or otherwise can provide a result to the KMS client 130 the fastest out of the service KMSs 120A-N. The primary service KMS may be part of the same datacenter as the KMS client 130. The secondary service KMS(s) may be chosen to be the next closest to the KMS client 130 or otherwise is the one that can provide a result to the KMS client 130 the next fastest under normal operating conditions. As another example, the secondary service KMS(s) may be selected to prioritize route diversity. The KMS client 130 transmits the key service request to the primary service KMS first. If the primary service KMS is not available, or it is slow to respond (e.g., it does not respond within a time period), the KMS client 130 transmits the key service request to a secondary service KMS. In FIG. 1, the KMS client 130 transmits the KMS service request 150 to the service KMS 120A. If the service KMS 120A does not respond, or it is slow to respond, the KMS client 130 transmits the KMS service request 152 to the service KMS 120B or transmits the KMS service request 154 to the service KMS 120N.

In another example, each of the service KMS 120A-N are any casted to the same IP address such that KMS service requests from KMS clients are received at the service KMS 120 that is closest to the KMS client in terms of routing protocol configuration (e.g., BGP configuration) according to an anycast implementation as determined by the network infrastructure (e.g., router(s), switch(es), and/or other network equipment between the service KMS 120A-N and the KMS clients). With respect to FIG. 1, for example, the KMS client 130 is closest to the service KMS 120A according to an anycast implementation. Accordingly, a KMS service request from the KMS client 130 will be received by the service KMS 120A.

In another example, a KMS client 130 uses a load balancing algorithm when transmitting a KMS service request to the service KMSs 120A-N (e.g., based on load of the service KMSs 120A-N). In another example, a KMS client 130 uses a round-robin technique for transmitting the KMS service request to at least a group of service KMSs 120A-N.

A service KMS 120 receives the KMS service request from the KMS client. If the service KMS 120 can perform the requested KMS service with a locally available key, the service KMS 120 performs the requested key operation and transmits a key service response to the KMS client 130. This is done without querying the central KMS 110. The key service response includes the result of the requested key operation. If, for example, the KMS service request is to decrypt an encrypted data key (unwrap a data key), the key service response includes the decrypted data key. As illustrated in FIG. 1, the service KMS 120A transmits the KMS service response 160, the service KMS 120B transmits the KMS service response 162, and the service KMS 120N transmits the KMS service response 164.

If the service KMS 120 does not have the key necessary to perform the requested key operation, the service KMS 120 queries the central KMS 110 for the key and associated policy. The service KMS 120 then performs the requested key operation using the queried key and transmits the key service response to the KMS client 130.

Although embodiments describe a single key service request being serviced by a single service KMS, in another embodiment multiple service KMSs are required to service a single key service request. For example, in an embodiment, a managed key is split according to a threshold cryptography system where a number n of service KMSs from a group of m service KMSs are required to use the managed key (e.g., decrypt). As an example, if the number n is 2 and the number m is 5, the KMS client 130 transmits a KMS service request to at least five of the service KMSs 120A-N.

Figure 2:
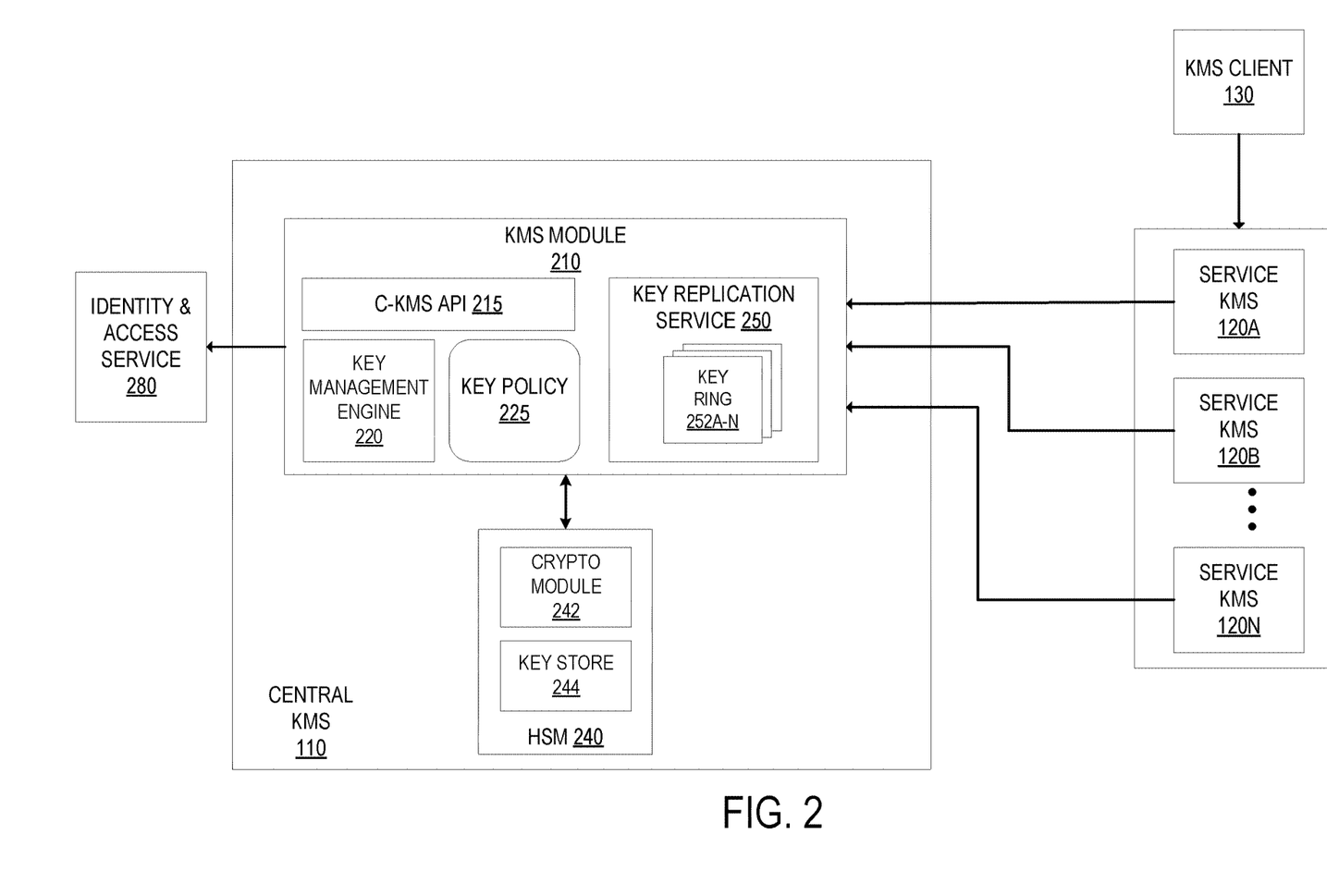
FIG. 2 shows an exemplary central KMS according to an embodiment.

FIG. 2 shows an exemplary central KMS according to an embodiment. In an embodiment, the central KMS 110 is hosted on system that includes a minimal set of kernel and userspace components required to support the management of key lifecycle, access, operation, and administration of managed keys and associated policies. The host system may use a hardware-based root-of-trust, Trusted Execution Environment (TEE). The central KMS 110 includes the KMS module 210 and the hardware security module (HSM) 240.

The KMS module 210 includes the C-KMS API 215, the key management engine 220, the key policy store 225, and the key replication service 250. The C-KMS API 215 provides an interface for the service KMS 120A-N to use the features and services provided by the C-KMS 110. For example, the C-KMS API 215 provides an interface for cryptographic functions using managed keys such as encrypting a data key, decrypting a data key, signing, verifying, creating a data key, creating a data key pair, and/or generating a random number. As another example, the C-KMS API 215 provides an interface for defining and/or updating a key policy for a managed key.

The key policies are stored in the key policy store 225. Each managed key may be associated with its own policy to enforce fine-grained access control based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range).

The key replication service 250 prepares and serves managed key rings 252A-N (a collection of managed keys and policies) to the service KMSs 120A-N. Each key ring 252 may be organized based on business and/or compliance requirements. Each key ring 252 is stored and protected using a managed key of the central KMS 110. Each key ring 252 that is transmitted to a service KMS 120 has a data encryption key (DEK) that is wrapped with a unique key of that service KMS 120 (e.g., a public key of that service KMS 120). The KMS module 210 uses the key replication service 250 to periodically replicate the managed keys and associated policies to the service KMSs 120A-N. Although not shown in FIG. 2, there may be one or more applications running on the central KMS that are clients of the KMS module 210.

The TLS key distribution service 270 generates and/or distributes TLS keys. The private keys 272 are decrypted with a data encryption key (DEK) and the DEK is in turn wrapped by a managed key in the central KMS 110.

Figure 3:
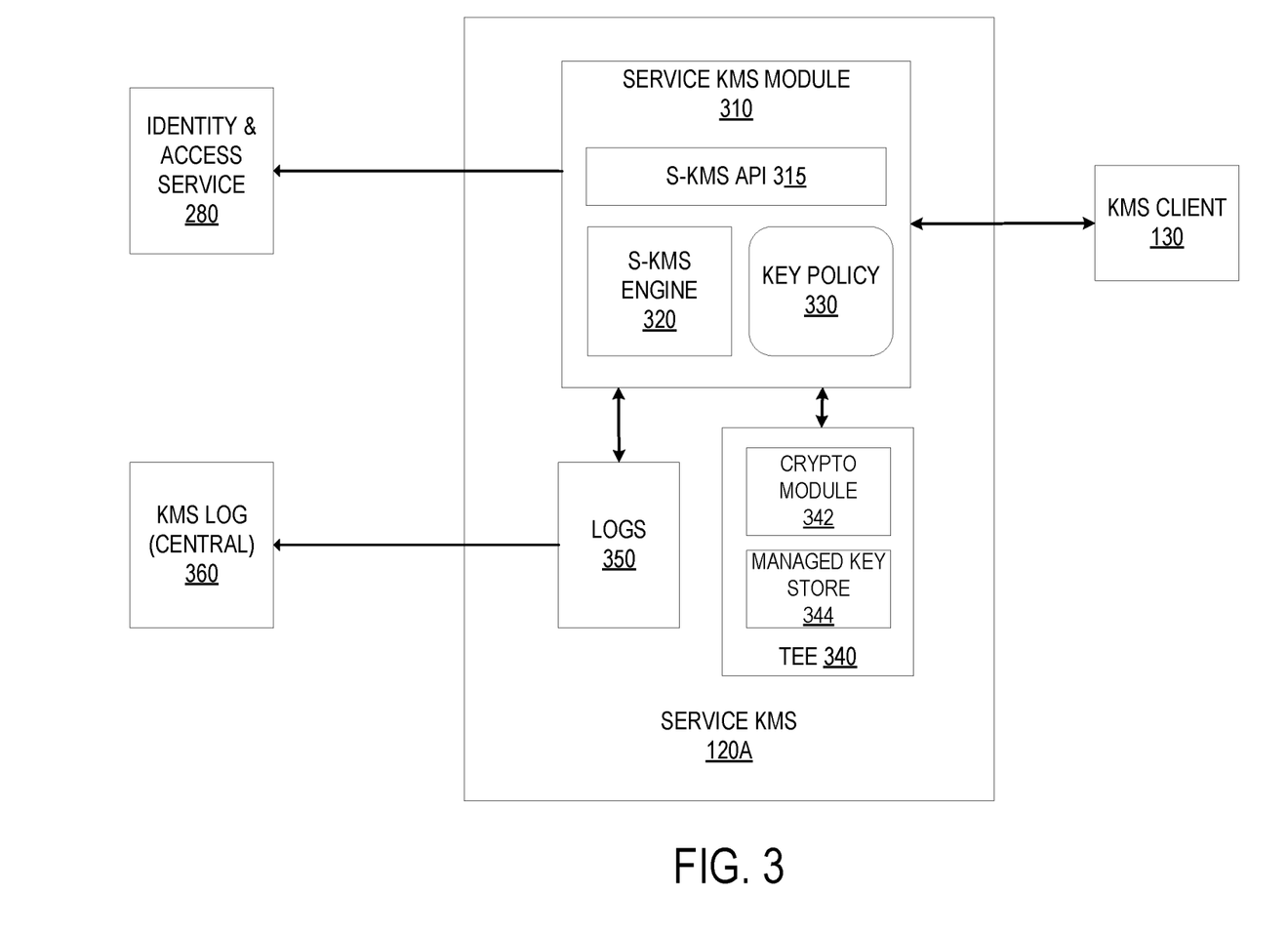
FIG. 3 shows an exemplary service KMS according to an embodiment.

FIG. 3 shows an exemplary service KMS 120A according to an embodiment. In an embodiment, the service KMS 120A is hosted on system that includes a minimal set of kernel and userspace components required to support the functions of the service KMS 120A. The host system may use a hardware-based root-of-trust, Trusted Execution Environment (TEE). The service KMS 110 includes the service KMS module 310, the TEE 340, and the logs 350. The service KMS module 310 includes the S-KMS API 315, the S-KMS engine 320, and the key policy 330.

The service KMS module 310 receives the replicated managed keys and associated policies from the central KMS 110. The replicated managed keys are stored in the managed key store 344 of the TEE 340. The key policy 330 is protected by a managed key stored in the managed key store 344 in the TEE 340. The key policy 330 can define fine-grained access control for using a managed key for a key operation based on one or more attributes including identity, IP address, and protocol. For example, an identity (e.g., a user, a group, an application) may be granted permission to use a managed key (e.g., encrypt, decrypt) with one or more optional conditions (e.g., protocol type, host IP address, location (e.g., host geographic location or region), time and/or date (e.g., time of the day, day of the week, date range). The TEE 340 also includes the cryptographic module 342 that performs cryptographic operations using a managed key stored in the managed key store 344.

The S-KMS API 315 provides an interface for KMS clients to use the features and services provided by the service KMS 120A. For example, the S-KMS API 315 provides an interface for cryptographic functions using managed keys such as encrypting, decrypting, signing, verifying, creating a data key, creating a data key pair, and/or generating a random number. The KMS client 130 may use the S-KMS API 314 to make a KMS service request. The connection between the KMS client 130 and the service KMS 120A may be over a secure connection (e.g., an mTLS connection). Further, the service KMS 120A and the KMS client 120 may authenticate each other using HW rooted of trust.

The S-KMS engine 320 controls the execution of the functions of the service KMS 120A including processing the KMS service requests received from KMS clients. If a KMS service request requires use of a managed key that is not locally available to the S-KMS engine 320 (e.g., the managed key is not included in the managed key store 344), the S-KMS engine 320 causes a query for the managed key and associated policy to be transmitted to the central KMS 110. The managed key received from the central KMS 110 is stored in the managed key store 344.

Processing a KMS service request may include enforcing the policy associated with the managed key that is necessary for the requested operation. For example, the S-KMS engine 320 checks a requested key action against a CMK policy to determine whether the requested action is permitted for the subject identity. To authenticate the subject identity, the S-KMS engine 320 may access the identity and access service 280 to authenticate the identity of the subject (e.g, a user, a group, an application, a system). If permitted, the K-KMS engine 320 causes the cryptographic module 342 to perform the requested cryptographic operation (e.g., encrypt, decrypt, sign, verify, create a data key, create a data key pair, generate a random number, etc.).

In an embodiment, the S-KMS engine 320 may cause a managed key and/or an associated policy to be transmitted to other service KMSs 120. Further, the S-KMS engine 320 may receive and install a managed key and/or associated policy received from another service KMS 120.

The service KMS 120A may include the logs 350 that log information about the managed keys such as key usage information (e.g., when a managed key was accessed, who accessed the managed key, how many times a key was accessed, the operation that was performed, etc.). The logs 350 may be transmitted to the KMS log 360 that is stored on the central KMS 110. The central KMS 110 may collect and analyze the logs received from the service KMS 120A-N.

Figure 4:
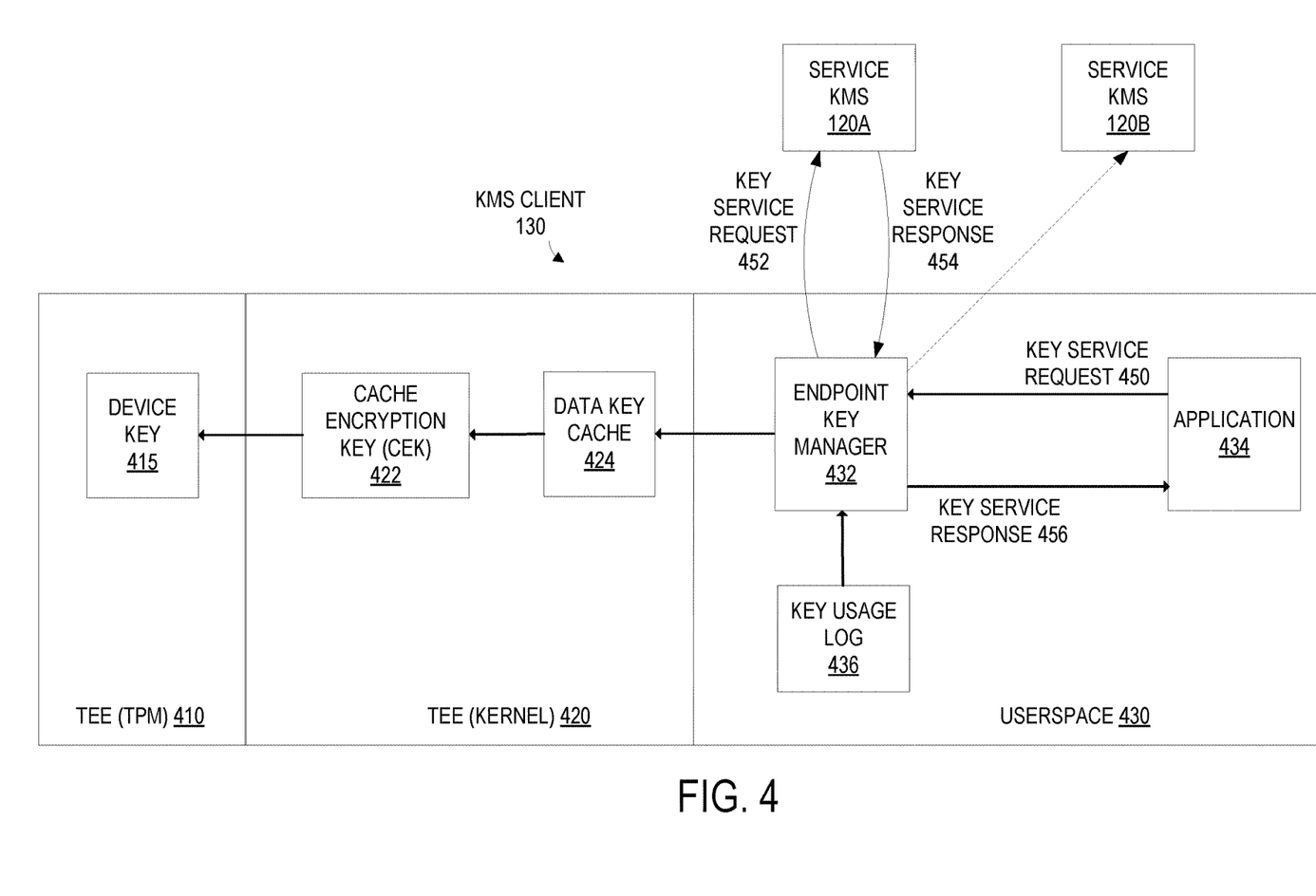
FIG. 4 shows an exemplary KMS client according to an embodiment.

FIG. 4 shows an exemplary KMS client 130 according to an embodiment. The KMS client 130 includes the TEE (TPM) 410, the TEE (kernel) 420, and the userpace 430. The application 434 runs in the userspace 430 and makes requests for cryptographic operations (e.g., decrypt, encrypt, sign, verify). As illustrated in FIG. 4, the application 434 makes a key service request 450 that is received by the endpoint key manager 432. The endpoint key manager 432 is a userspace service that provides key management functions to local userspace applications such as the application 434. The endpoint key manager 432 forwards KMS service requests to a service KMS 120 if it cannot locally respond to the service request. For example, if the KMS service request 450 is for unwrapping a data key, the endpoint key manager 432 checks the data key cache 424 for the data key and if not available, transmits the key service request to a service KMS 120. As illustrated in FIG. 4, the endpoint key manager 432 transmits the key service request 452 to the service KMS 120A and receives the key service response 454 from the service KMS 120A. The service KMS 120A may be the primary service KMS for the KMS client 130. If the service KMS 120 is not available or is slow to respond (e.g., it does not respond within a time period), the endpoint key manager 432 transmits the key service request to another service KMS (e.g., the service KMS 120B). The endpoint key manager 432 receives the key service response 454 and forwards the key service response 456 to the application 434. For example, if the request is to unwrap a data key, the endpoint key manager 432 transmits the data key to the application 434 and may store the data key in the data key cache 424.

The TEE (kernel) 420 includes the data key cache 424 that is encrypted by the cache encryption key (CEK) 422 that is protected by the device key 415 of the TPM 410. The CEK 422 may be randomly generated by the TPM 410 when the KMS client 130 boots. The data key cache 424 may be stored in kernel memory and encrypted by the CEK 422.

Figure 5:
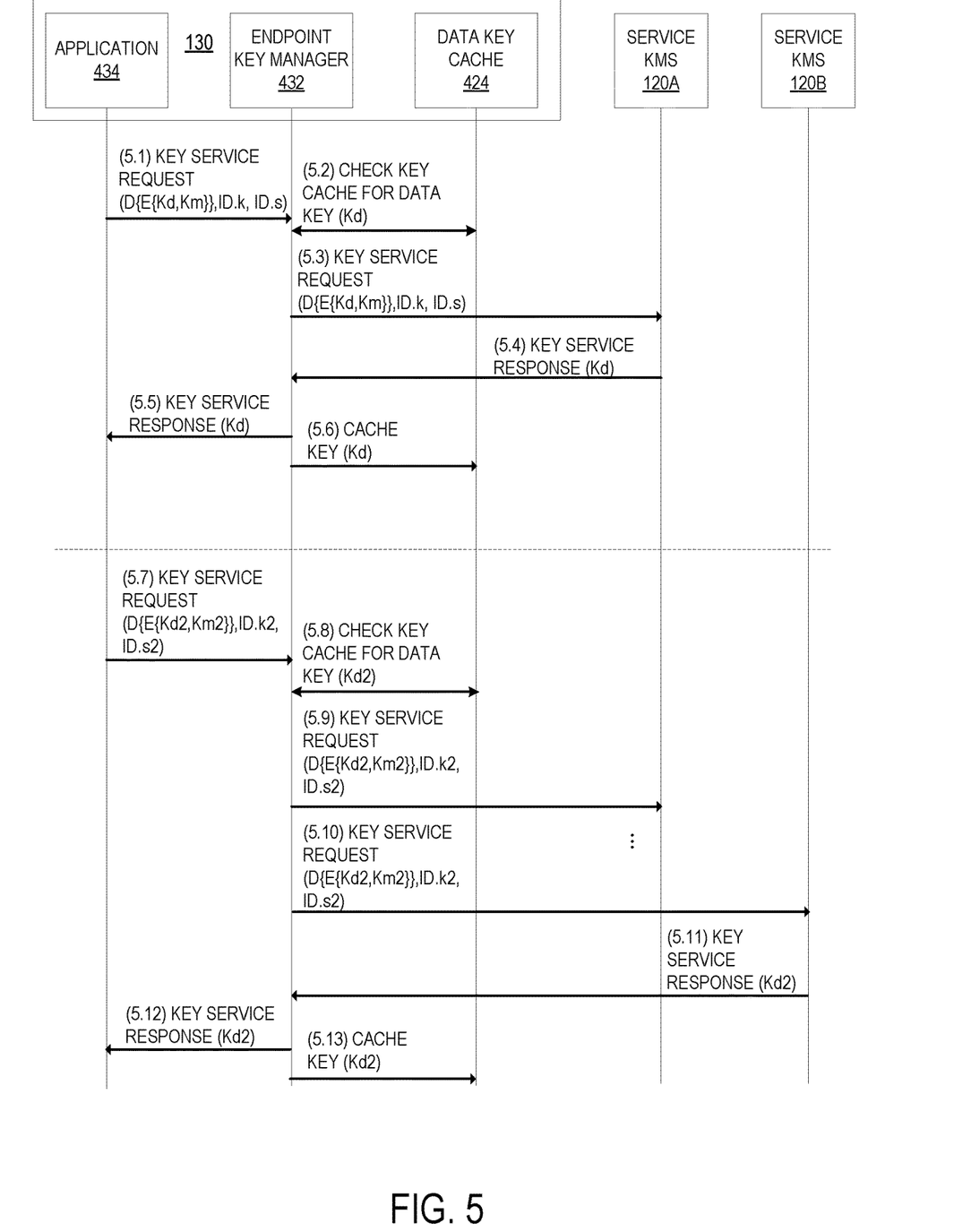
FIG. 5 shows a sequence diagram that illustrates operations performed by a KMS client in a distributed key management system according to an embodiment.
Figure 6:
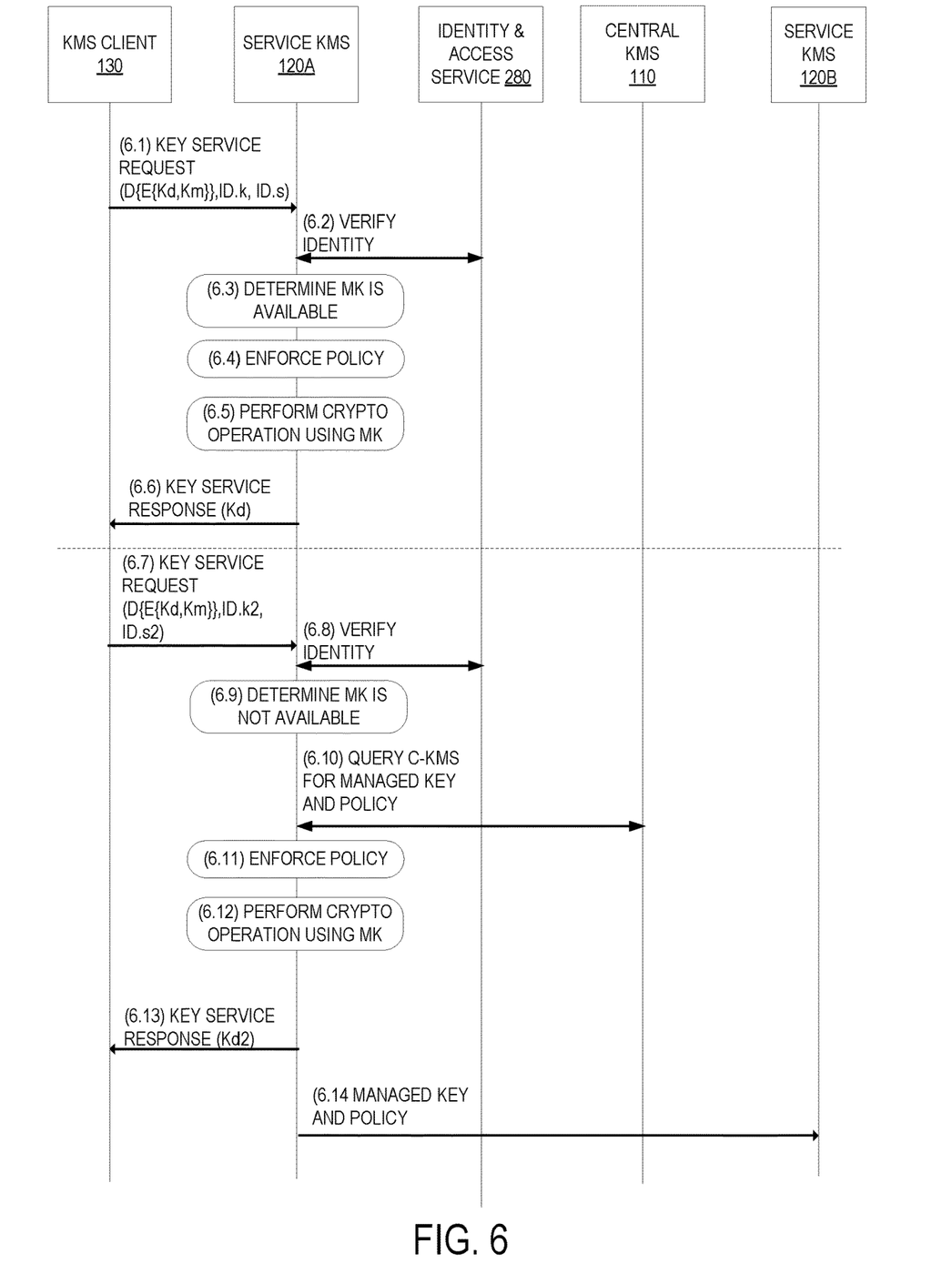
FIG. 6 shows a sequence diagram that illustrates exemplary operations performed at least in part by a service KMS of a distributed key management system according to an embodiment.
Figure 7:
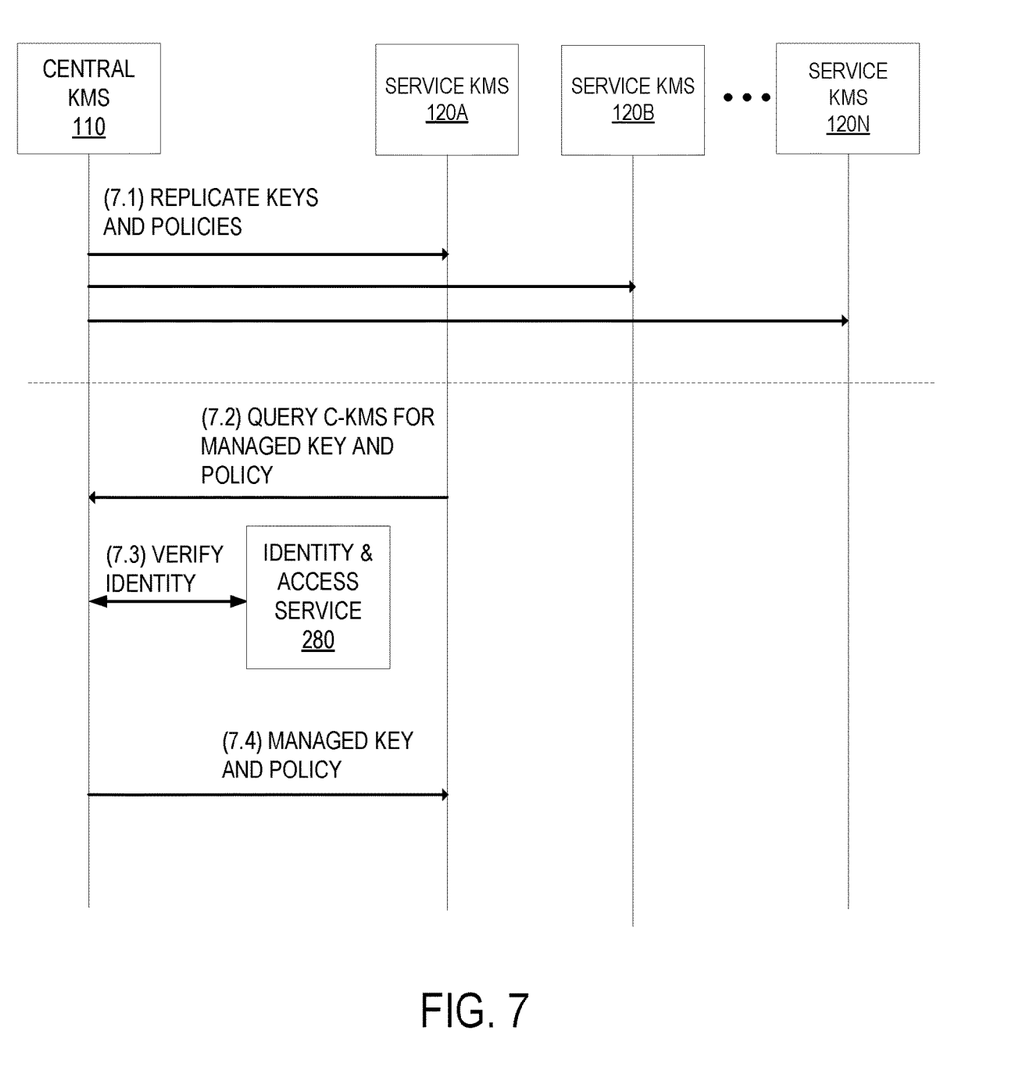
FIG. 7 shows a sequence diagram that illustrates exemplary operations performed by a central KMS in a distributed key management system according to an embodiment.

FIGS. 5-7 are sequence diagrams that illustrate exemplary operations for a distributed key management system according to an embodiment. FIG. 5 shows a sequence diagram that illustrates operations performed by a KMS client in a distributed key management system according to an embodiment. FIG. 6 shows a sequence diagram that illustrates exemplary operations performed at least in part by a service KMS of a distributed key management system according to an embodiment. FIG. 7 shows a sequence diagram that illustrates exemplary operations performed by a central KMS in a distributed key management system according to an embodiment.

At operation 5.1, the application 434 of the KMS client 130 makes a key service request to the endpoint key manager 432. The key service request is a request related to a managed key of the distributed KMS. In the examples of FIGS. 5-7, the key service request is a request to unwrap a data key (decrypt an encrypted data key). However, other types of key service requests may be made such as a request to encrypt a data key, sign a message, verify a signed message, create a data key, create a data key pair, and/or generate a random number. In the example of FIG. 5, the key service request includes a request to decrypt the data key (Kd) that is encrypted by the managed key (Km), a key identifier (ID.k) that identifies the managed key (Km), and a subject identifier (ID.s) that identifies the subject identity associated with the KMS service request. The key identifier identifies the managed key and is associated with the policy for the managed key. The request may also include a credential of the subject identity. The KMS service request may also include additional information used to validate the subject identity and/or the request such as host information (e.g., IP address, OS version, patch status, device posture, etc.).

The data key may be cached in the data key cache 424. The endpoint key manager 432 checks the data key cache 424 for the data key at operation 5.2. In the example of FIG. 5, the data key is not cached in the data key cache 424 at the time of the key service request of operation 5.1. Because the data key is not cached in the data key cache 424, the endpoint key manager 432 transmits the key service request at operation 5.3 to the service KMS 120A. The key service request transmitted in operation 5.3 may be like the key service request transmitted in operation 5.1. The key service request may be received at the service KMS 120A out of the service KMS 120A-N because it is the closest to the KMS client 130 or otherwise is the one that can provide a result to the KMS client 130 the fastest under normal operating conditions. The service KMS 120A may be part of the same datacenter as the KMS client 130. In an embodiment, the KMS client 130 includes the KMS configuration 132 that specifies the service KMS 120A is the primary service KMS, and the service KMS 120B and the service KMS 120C are secondary service KMSs.

Referring to FIG. 6, the key service request is received at the service KMS 120A in operation 6.1. This key service request may be the key service request transmitted in operation 5.3 of FIG. 5. In the example of FIG. 6, the key service request is a request to unwrap a data key (decrypt an encrypted data key). The key service request includes a request to decrypt the data key (Kd) that is encrypted by the managed key (Km), and the key service request also includes a key identifier (ID.k) that identifies the managed key (Km), and a subject identifier (ID.s) that identifies the subject identity associated with the KMS service request. The key identifier identifies the managed key and is associated with the policy for the managed key. The request may also include a credential of the subject identity. The KMS service request may also include additional information used to validate the subject identity and/or the request such as host information (e.g., IP address, OS version, patch status, device posture, etc.).

In an embodiment, each managed key is associated with a policy for access control based on one or more attributes including identity, IP address, and protocol. In the example of FIG. 6, the key service request includes a subject identity. The subject identity may be associated with a user, a group, an application, or a system. At operation 6.2, which is optional in an embodiment, the service KMS 120A authenticates the subject identity with the identity and access service 280. If the identity cannot be authenticated, then the operations stop.

In an embodiment, the central KMS 110 periodically replicates the managed keys and policies to the service KMS 120A-N at a predefined schedule. This is shown in operation 7.1 of FIG. 7. However, it is possible that a service KMS 120 can receive a key service request that requires use of a managed key that it has not received from the central KMS 110. For example, that service KMS 120 may have been down or otherwise experiencing an error when receiving a periodic replication update. After receiving a key service request, the service KMS 120A determines whether the managed key that can service the request (e.g., unwrap the data key) is locally available. For instance, the service KMS 120A checks the managed key store 344 for the managed key identified in the request for servicing the request. If the managed key is not available, then the service KMS 120A queries the central KMS 110 for the managed key and/or transmits a query to another service KMS 120 for the managed key. In this initial example of FIG. 6, the service KMS 120A determines that the managed key that can service the request is available at operation 6.3.

Next, at operation 6.4, the service KMS 120A enforces the policy associated with the managed key for servicing the request. As an example, the policy may specify the identity(ies) that are allowed to access the managed key, the actions that are permitted (e.g., encrypt, decrypt), and one or more conditions (e.g., protocol type, host IP address, location (e.g., host geographic location or region), time and/or date (e.g., time of the day, day of the week, date range)). The example in FIG. 6 assumes that the requested cryptographic operation (e.g., decrypt the data key using the managed key) is allowed for the requester.

Next, at operation 6.5, the service KMS 120A performs the cryptographic operation requested in the key service request. If, for example, the request is to unwrap the data key, the cryptographic module 342 uses the managed key to decrypt the encrypted data key. The service KMS 120A transmits a key service response to the KMS client 130 at operation 6.6. The key service response includes the result of processing the key service request. In this example, it includes the unwrapped data key Kd.

Referring to FIG. 5, the endpoint key manager 432 of the KMS client 130 receives the key service response from the service KMS 120A at operation 5.4. The endpoint key manager 432 provides the response (e.g., the unwrapped data key Kd) to the application 434 at operation 5.5. The endpoint key manager 432 may also cause the unwrapped data key Kd to be cached in the data key cache 424 at operation 5.6. The application 434 uses the unwrapped data key for its application.

Sometime later, at operation 5.7, the application 434 transmits a second key service request to the endpoint key manager 432. The second key service request includes a request to decrypt the data key (Kd2) that is encrypted by the managed key (Km2), and the key service request also includes a key identifier (ID.k2) that identifies the managed key (Km2), and a subject identifier (ID.s2) that identifies the subject identity associated with the KMS service request. The request may also include a credential of the subject identity. The KMS service request may also include additional information used to validate the subject identity and/or the request such as host information (e.g., IP address, OS version, patch status, device posture, etc.). The endpoint key manager 432 checks the data key cache 424 for the data key at operation 5.8. In the example of FIG. 5, the data key is not cached in the data key cache 424 at the time of the key service request of operation 5.7. Because the data key is not cached in the data key cache 424, the endpoint key manager 432 transmits the key service request at operation 5.9 to the service KMS 120A. The key service request transmitted in operation 5.9 may be like the key service request transmitted in operation 5.7.

In this example, the service KMS 120A is unavailable or slow to respond to the KMS client 130 (e.g., the KMS client 130 does not receive a response within a period). Because of this, at operation 5.10, the KMS client 130 transmits the second key service request to the service KMS 120B. The service KMS 120B may be configured as a secondary or a backup service KMS for the KMS client 130. Alternatively, the service KMS 120B may receive the second key service request as a result of an anycast implementation determining that the service KMS 120B has become closest to the KMS client 130 out of the service KMS 120A-N. The service KMS 120B receives and processes the key service request in a similar way as described with respect to the operations of FIG. 6.

At operation 5.11, the endpoint key manager 432 of the KMS client 130 receives the key service response from the service KMS 120A at operation 5.11. The endpoint key manager 432 provides the response (e.g., the unwrapped data key Kd2) to the application 434 at operation 5.12. The endpoint key manager 432 may also cause the unwrapped data key Kd2 to be cached in the data key cache 424 at operation 5.13. The application 434 uses the unwrapped data key for its application.

FIG. 6 also includes an example of a service KMS receiving a key service request that requires use of a managed key that is not locally available to that service KMS. These operations are described in operations 6.7-6.14. At operation 6.7, the service KMS 120A receives a key service request from the KMS client 130. In this example, the key service request is a request to unwrap a data key (decrypt an encrypted data key). At operation 6.8, which is optional in an embodiment, the service KMS 120A authenticates the subject identity with the identity and access service 280. If the subject identity cannot be authenticated, then the operations stop.

The service KMS 120A determines whether the managed key that can service the request (e.g., unwrap the data key) is locally available. For instance, the service KMS 120A checks the managed key store 344 for the managed key that can service the request. If the managed key is not available, then the service KMS 120A queries the central KMS 110 for the managed key and/or transmits a query to another service KMS 120 for the managed key. In this example of FIG. 6, the service KMS 120A determines that the managed key that can service the request is not available at operation 6.9.

At operation 6.10, the service KMS 120A queries the central KMS 110 for the managed key and associated policy. Referring to FIG. 7, the central KMS 110 receives the query from the service KMS 120A at operation 7.2. The central KMS 110 may authenticate the subject identity with the identity with the identity and access service 280. If the identity cannot be authenticated, then the operations stop. The central KMS 110 responds with the queried managed key and policy to the service KMS 120A at operation 7.4. Alternatively or in addition to returning the managed key and policy, the service KMS 120A may transmit the KMS service request to the central KMS 110 which in turn performs the cryptographic operation and returns the result to the service KMS 120A.

The service KMS 120A stores the managed key and associated policy. For example, the managed key is stored in the managed key store 344 of the TEE 340. The managed key may be protected by a primary key stored in the TPM. Next, at operation 6.11, the service KMS 120A enforces the policy associated with the managed key for servicing the request. As an example, the policy may specify the identity(ies) that are allowed to access the managed key, the actions that are permitted (e.g., encrypt, decrypt), and one or more conditions (e.g., protocol type, host IP address, location (e.g., host geographic location or region), time and/or date (e.g., time of the day, day of the week, date range)). The example in FIG. 6 assumes that the requested cryptographic operation (e.g., decrypt the data key using the managed key) is allowed for the requester.

Next, at operation 6.12, the service KMS 120A performs the cryptographic operation requested in the key service request. If, for example, the request is to unwrap the data key, the cryptographic module 342 uses the managed key to decrypt the encrypted data key. The service KMS 120A transmits a key service response to the KMS client 130 at operation 6.13. The key service response includes the result of processing the key service request. In this example, it includes the unwrapped data key Kd.

In an embodiment, the service KMS 120A transmits the managed key and associated policy it received from the central KMS 110 to one or more other service KMSs. In the example shown in FIG. 6, the service KMS 120A transmits the managed key and policy it received from the central KMS 110 to the service KMS 120B.

Figure 8:
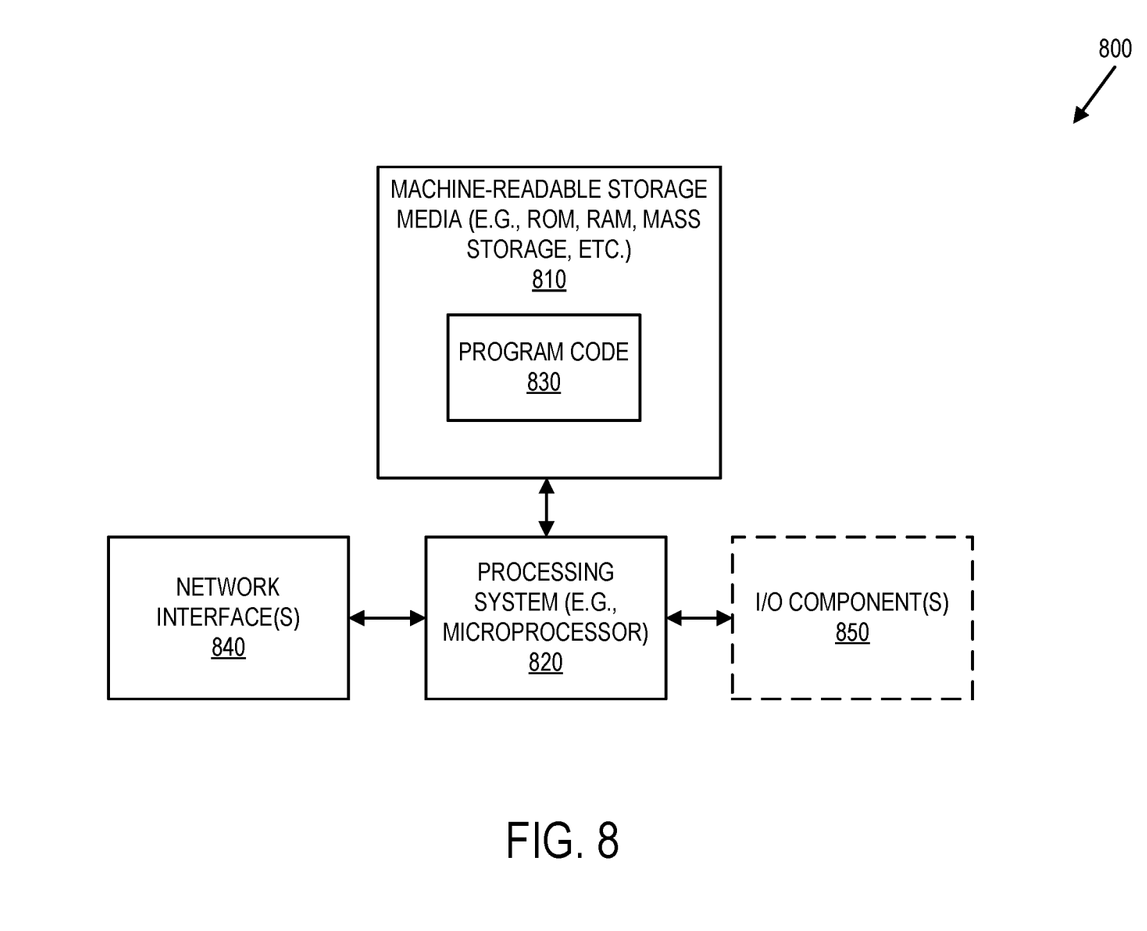
FIG. 8 is a block diagram illustrating a data processing system that can be used in an embodiment.

FIG. 8 illustrates a block diagram for an exemplary data processing system 800 that may be used in some embodiments. One or more such data processing systems 800 may be utilized to implement the embodiments and operations described with respect to the central KMS, service KMS, and/or KMS client. Data processing system 800 includes a processing system 820 (e.g., one or more processors and connected system components such as multiple connected chips). The data processing system 800 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 810 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 820. For example, the depicted machine-readable storage media 810 may store program code 830 that, when executed by the processor(s) 820, causes the data processing system 800 to execute the operations described for the central KMS, service KMS, and/or the KMS client.

The data processing system 800 also includes one or more network interfaces 840 (e.g., a wired and/or wireless interfaces) that allows the data processing system 800 to transmit data and receive data from other computing devices, typically across one or more networks (e.g., Local Area Networks (LANs), the Internet, etc.). The data processing system 800 may also include one or more input or output ("I/O") components 850 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 800, and, in certain embodiments, fewer components than that shown in One or more buses may be used to interconnect the various components shown in FIG. 8.

The techniques shown in the figures can be implemented using code and data stored and executed on one or more electronic devices (e.g., a central KMS, a service KMS, a KMS client). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

In the preceding description, numerous specific details are set forth to provide a more thorough understanding of embodiments. However, embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments, such order is exemplary (e.g., alternative embodiments may perform the operations in a different order, combine certain operations, overlap certain operations, etc.).

While the invention has been described in terms of several embodiments, the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a first one of a plurality of intermediate key management system (KMS) servers of a distributed KMS from a central KMS server of the distributed KMS, a plurality of managed keys, wherein the central KMS server centrally manages lifecycle of the plurality of managed keys, and wherein the plurality of intermediate KMS servers are geographically distributed;
   receiving, at the first one of the plurality of intermediate KMS servers, a first KMS service request from a first KMS client, wherein each of the plurality of intermediate KMS servers is capable of servicing the first KMS service request;
   determining, at the first intermediate KMS server, that the first intermediate KMS server has access to a first managed key received from the central KMS server, wherein the first managed key is capable of performing an action requested in the first KMS service request;
   performing, at the first intermediate KMS server, the action requested in the first KMS service request using the first managed key;
   transmitting, from the first intermediate KMS server to the first KMS client, a response to the first KMS service request that includes a result of the performed action using the first managed key;
   receiving, at the first one of the plurality of intermediate KMS servers, a second KMS service request from a second KMS client, wherein each of the plurality of intermediate KMS servers is capable of servicing the second KMS service request;
   determining, at the first intermediate KMS server, that the first intermediate KMS server does not have local access to a second managed key that is capable of performing an action requested in the second KMS service request;
   transmitting, from the first intermediate KMS server to the central KMS server of the distributed KMS, a query for the second managed key;
   receiving, from the central KMS server at the first intermediate KMS server, the second managed key;
   performing, at the first intermediate KMS server, the action requested in the second KMS service request using the second managed key; and
   transmitting, from the first intermediate KMS server to the second KMS client, a response to the second KMS service request that includes a result of the performed action using the second managed key.

2. The method of claim 1, further comprising:
   receiving, at the first one of the plurality of intermediate KMS servers from a second one of the plurality of intermediate KMS servers, a third managed key that is not one of the plurality of managed keys;
   receiving, at the first one of the plurality of intermediate KMS servers, a third KMS service request from a third KMS client, wherein each of the plurality of intermediate KMS servers is capable of servicing the third KMS service request, and wherein the first intermediate KMS server is closest to the third KMS client out of the plurality of intermediate KMS servers;
   determining, at the first intermediate KMS server, that the first intermediate KMS server has access to the third managed key that is capable of performing an action requested in the third KMS service request;
   performing, at the first intermediate KMS server, the action requested in the third KMS service request using the third managed key; and
   transmitting, from the first intermediate KMS server to the third KMS client, a response to the third KMS service request that includes a result of the performed action using the third managed key.

3. The method of claim 1, further comprising:
   receiving, at the first one of the plurality of intermediate key management system (KMS) servers of the distributed KMS from the central KMS server, a plurality of policies associated with the plurality of managed keys respectively; and enforcing the one of the plurality of policies that is associated with the first managed key prior to performing the action requested in the first KMS service request using the first managed key.

4. The method of claim 3, wherein enforcing the one of the plurality of policies includes:

determining an identity associated with the first KMS service request; and determining that the action requested in the first KMS service request is allowed for the determined identity.

5. The method of claim 1, wherein performing the action requested in the first KMS service request is performed without the first intermediate KMS server contacting the central KMS server.

6. The method of claim 1, wherein the first intermediate KMS server is closest to the first KMS client and closest to the second KMS client out of the plurality of intermediate KMS servers.

7. The method of claim 1, wherein the first intermediate KMS server is part of a same datacenter as the first KMS client.

8. The method of claim 1, wherein the first KMS client and the second KMS client are each a compute server in a distributed cloud computing network.

9. A non-transitory machine-readable storage medium that provides instructions that, when executed by a processor, will cause said processor to perform the following operations:

receiving, at a first one of a plurality of intermediate key management system (KMS) servers of a distributed KMS from a central KMS server of the distributed KMS, a plurality of managed keys, wherein the central KMS server centrally manages lifecycle of the plurality of managed keys, and wherein the plurality of intermediate KMS servers are geographically distributed;

receiving, at the first one of the plurality of intermediate KMS servers, a first KMS service request from a first KMS client, wherein each of the plurality of intermediate KMS servers is capable of servicing the first KMS service request;

determining, at the first intermediate KMS server, that the first intermediate KMS server has access to a first managed key received from the central KMS server, wherein the first managed key is capable of performing an action requested in the first KMS service request;

performing, at the first intermediate KMS server, the action requested in the first KMS service request using the first managed key;

transmitting, from the first intermediate KMS server to the first KMS client, a response to the first KMS service request that includes a result of the performed action using the first managed key;

receiving, at the first one of the plurality of intermediate KMS servers, a second KMS service request from a second KMS client, wherein each of the plurality of intermediate KMS servers is capable of servicing the second KMS service request;

determining, at the first intermediate KMS server, that the first intermediate KMS server does not have local access to a second managed key that is capable of performing an action requested in the second KMS service request;

transmitting, from the first intermediate KMS server to the central KMS server of the distributed KMS, a query for the second managed key;

receiving, from the central KMS server at the first intermediate KMS server, the second managed key;

performing, at the first intermediate KMS server, the action requested in the second KMS service request using the second managed key; and transmitting, from the first intermediate KMS server to the second KMS client, a response to the second KMS service request that includes a result of the performed action using the second managed key.

10. The non-transitory machine-readable storage medium of claim 9, wherein the operations further comprise:

receiving, at the first one of the plurality of intermediate KMS servers from a second one of the plurality of intermediate KMS servers, a third managed key that is not one of the plurality of managed keys;

receiving, at the first one of the plurality of intermediate KMS servers, a third KMS service request from a third KMS client, wherein each of the plurality of intermediate KMS servers is capable of servicing the third KMS service request, and wherein the first intermediate KMS server is closest to the third KMS client out of the plurality of intermediate KMS servers;

determining, at the first intermediate KMS server, that the first intermediate KMS server has access to the third managed key that is capable of performing an action requested in the third KMS service request;

performing, at the first intermediate KMS server, the action requested in the third KMS service request using the third managed key; and transmitting, from the first intermediate KMS server to the third KMS client, a response to the third KMS service request that includes a result of the performed action using the third managed key.

11. The non-transitory machine-readable storage medium of claim 9, wherein the operations further comprise:

receiving, at the first one of the plurality of intermediate key management system (KMS) servers of the distributed KMS from the central KMS server, a plurality of policies associated with the plurality of managed keys respectively; and enforcing the one of the plurality of policies that is associated with the first managed key prior to performing the action requested in the first KMS service request using the first managed key.

12. The non-transitory machine-readable storage medium of claim 11, wherein enforcing the one of the plurality of policies includes:

determining an identity associated with the first KMS service request; and determining that the action requested in the first KMS service request is allowed for the determined identity.

13. The non-transitory machine-readable storage medium of claim 9, wherein performing the action requested in the first KMS service request is performed without the first intermediate KMS server contacting the central KMS server.

14. The non-transitory machine-readable storage medium of claim 9, wherein the first intermediate KMS server is closest to the first KMS client and closest to the second KMS client out of the plurality of intermediate KMS servers.

15. The non-transitory machine-readable storage medium of claim 9, wherein the first intermediate KMS server is part of a same datacenter as the first KMS client.

16. The non-transitory machine-readable storage medium of claim 9, wherein the first KMS client and the second KMS client are each a compute server in a distributed cloud computing network.

17. A first intermediate key management system (KMS) server of a plurality of intermediate KMS servers of a distributed KMS, comprising:
- a processor; and
- a non-transitory machine-readable storage medium that provides instructions that, when executed by the processor, will cause the first intermediate KMS server to carry out the following operations:
  - receiving, at the first intermediate KMS server of the distributed KMS from a central KMS server of the distributed KMS, a plurality of managed keys, wherein the central KMS server centrally manages lifecycle of the plurality of managed keys, and wherein the plurality of intermediate KMS servers are geographically distributed;
  - receiving, at the first intermediate KMS server, a first KMS service request from a first KMS client, wherein each of the plurality of intermediate KMS servers is capable of servicing the first KMS service request;
  - determining, at the first intermediate KMS server, that the first intermediate KMS server has access to a first managed key received from the central KMS server, wherein the first managed key is capable of performing an action requested in the first KMS service request;
  - performing, at the first intermediate KMS server, the action requested in the first KMS service request using the first managed key;
  - transmitting, from the first intermediate KMS server to the first KMS client, a response to the first KMS service request that includes a result of the performed action using the first managed key;
  - receiving, at the first intermediate KMS server, a second KMS service request from a second KMS client, wherein each of the plurality of intermediate KMS servers is capable of servicing the second KMS service request;
  - determining, at the first intermediate KMS server, that the first intermediate KMS server does not have local access to a second managed key that is capable of performing an action requested in the second KMS service request;
  - transmitting, from the first intermediate KMS server to the central KMS server of the distributed KMS, a query for the second managed key;
  - receiving, from the central KMS server at the first intermediate KMS server, the second managed key;
  - performing, at the first intermediate KMS server, the action requested in the second KMS service request using the second managed key; and
  - transmitting, from the first intermediate KMS server to the second KMS client, a response to the second KMS service request that includes a result of the performed action using the second managed key.

18. The first intermediate KMS server of claim 17, wherein the operations further comprise:
- receiving, at the first intermediate KMS server from a second one of the plurality of intermediate KMS servers, a third managed key that is not one of the plurality of managed keys;
- receiving, at the first intermediate KMS server, a third KMS service request from a third KMS client, wherein each of the plurality of intermediate KMS servers is capable of servicing the third KMS service request, and wherein the first intermediate KMS server is closest to the third KMS client out of the plurality of intermediate KMS servers;
- determining, at the first intermediate KMS server, that the first intermediate KMS server has access to the third managed key that is capable of performing an action requested in the third KMS service request;
- performing, at the first intermediate KMS server, the action requested in the third KMS service request using the third managed key; and
- transmitting, from the first intermediate KMS server to the third KMS client, a response to the third KMS service request that includes a result of the performed action using the third managed key.

19. The first intermediate KMS server of claim 17, wherein the operations further comprise:
- receiving, at the first intermediate KMS server from the central KMS server, a plurality of policies associated with the plurality of managed keys respectively; and
- enforcing the one of the plurality of policies that is associated with the first managed key prior to performing the action requested in the first KMS service request using the first managed key.

20. The first intermediate KMS server of claim 19, wherein enforcing the one of the plurality of policies includes:
- determining an identity associated with the first KMS service request; and
- determining that the action requested in the first KMS service request is allowed for the determined identity.

21. The first intermediate KMS server of claim 17, wherein performing the action requested in the first KMS service request is performed without the first intermediate KMS server contacting the central KMS server.

22. The first intermediate KMS server of claim 17, wherein the first intermediate KMS server is closest to the first KMS client and closest to the second KMS client out of the plurality of intermediate KMS servers.

23. The first intermediate KMS server of claim 17, wherein the first intermediate KMS server is part of a same datacenter as the first KMS client.

24. The first intermediate KMS server of claim 17, wherein the first KMS client and the second KMS client are each a compute server in a distributed cloud computing network.

* * * * *